(12) United States Patent
Settles et al.

(10) Patent No.: US 10,690,592 B2
(45) Date of Patent: Jun. 23, 2020

(54) HAPLOID SEED CLASSIFICATION USING SINGLE SEED NEAR-INFRARED SPECTROSCOPY

(71) Applicant: University of Florida Research Foundation, Incorporated, Gainesville, FL (US)

(72) Inventors: Andrew M. Settles, Gainesville, FL (US); Jeffery Lynn Gustin, II, Gainesville, FL (US)

(73) Assignee: University of Florida Research Foundation, Incorporated, Gainesville, FL (US)

(*) Notice: Subject to any disclaimer, the term of this patent is extended or adjusted under 35 U.S.C. 154(b) by 121 days.

(21) Appl. No.: 16/084,422

(22) PCT Filed: Mar. 14, 2017

(86) PCT No.: PCT/US2017/022310
§ 371 (c)(1),
(2) Date: Sep. 12, 2018

(87) PCT Pub. No.: WO2017/160844
PCT Pub. Date: Sep. 21, 2017

(65) Prior Publication Data
US 2019/0079006 A1    Mar. 14, 2019

Related U.S. Application Data

(60) Provisional application No. 62/308,549, filed on Mar. 15, 2016.

(51) Int. Cl.
*G01N 21/359* (2014.01)
*B07C 5/342* (2006.01)
*G01N 21/3563* (2014.01)

(52) U.S. Cl.
CPC ......... *G01N 21/359* (2013.01); *B07C 5/342* (2013.01); *B07C 5/3425* (2013.01); *G01N 21/3563* (2013.01); *G01N 2201/129* (2013.01)

(58) Field of Classification Search
None
See application file for complete search history.

(56) References Cited

U.S. PATENT DOCUMENTS

2008/0035532 A1    2/2008 Hunter et al.
2011/0225680 A1    9/2011 Cope
(Continued)

FOREIGN PATENT DOCUMENTS

| EP | 1578544 A1 | 9/2005 |
|---|---|---|
| EP | 2140749 A1 | 1/2010 |
| WO | WO 2002/48687 A2 | 6/2002 |

OTHER PUBLICATIONS

Armstrong, P. R. 2006. Rapid single-kernel NIR measurement of grain and oil-seed attributes. 3 Appl. Eng. Agric. 22:767-772. Retrieved from <https://www.ars.usda.gov/ARSUserFiles/30200525/ArmstrongCurrent/Rapid%20SKNIR%20Measurement%20Grain%20Oil%20Seed%20Attributes.pdf> on Sep. 10, 2018.
(Continued)

*Primary Examiner* — Shawn Decenzo
(74) *Attorney, Agent, or Firm* — Alston & Bird LLP

(57) ABSTRACT

Methods for sorting haploid maize kernels in haploid induction crosses are provided. A method of sorting haploid kernels can include capturing near-infrared (NIR) spectra and applying a general multivariate statistical model to the acquired NIR spectra to discriminate haploid kernels from diploid-hybrid kernels mixed therein. NIR spectra can be collected on a single kernel using a high-throughput apparatus such that the amount of time required to analyze individual kernels can be significantly reduced in compari-
(Continued)

son to existing NIR technology and in comparison to traditional manual sorting.

20 Claims, 4 Drawing Sheets

(56) References Cited

U.S. PATENT DOCUMENTS

| | | | |
|---|---|---|---|
| 2011/0297589 A1 | 12/2011 | Becker et al. | |
| 2013/0229647 A1* | 9/2013 | Fredlund | B07C 5/3425 356/51 |
| 2016/0327478 A1* | 11/2016 | Hilscher | B07C 5/3425 |
| 2017/0001220 A1* | 1/2017 | Arlinghaus | B07C 5/3425 |
| 2018/0218215 A1* | 8/2018 | Quenard | B07C 5/342 |
| 2019/0003931 A1* | 1/2019 | Melchinger | B07C 5/38 |
| 2019/0281781 A1* | 9/2019 | Borrowman | B07C 5/3425 |
| 2019/0317023 A1* | 10/2019 | Madderson | B07C 5/3425 |
| 2020/0055093 A1* | 2/2020 | Arlinghaus | B07C 5/3425 |

OTHER PUBLICATIONS

BoMill (http://www.bomill.com/) a single seed sorter which uses Near-infrared transmission (NIT) spectrocospy to sort wheat and barley seed at a rapid rate, Jul. 23, 2008 to Aug. 6, 2018, retrieved from Internet Archive at <http://web.archive.org/web/*/http://bomill.com> on Sep. 10, 2018, 10 pages.

Brimrose COA single seed NIR sorter product called Luminar 3076 that uses Acousto Optic Tunable Filter Near-Infrared (AOTF-NIR). http://www.brimrose.com/products/nir_mir_spectrometers/sort by spec (location no longer exists) retrieved from <https://www.brimrose.com/s/Seedmeister_Luminar3076-4yse.pdf> on Sep. 10, 2018.

Brimrose, "AOTF-NIR Spectrometer Product Catalog", 2017, retrieved from <https://www.brimrose.com/s/Brimrose_spectrometer_catalog-tnyc.pdf> on Sep. 10, 2018.

International Searching Authority, International Search Report and Written Opinion for International Application No. PCT/US2017/022310, dated Jun. 12, 2017, 17 pages, Korean Intellectual Property Office, Republic of Korea.

Iowa State University, "Germplasm Enhancement of Maize (GEM) Project" at http://www.public.iastate.edu/~usda-gem/GEM_Project/GEM_Project.htm, Sep. 3, 2006 to Jul. 7, 2018, Internet Archive, retrieved from <https://web.archive.org/web/*/http://www.public.iastate.edu/~usda-gem/GEM_Project/GEM_Project.htm> on Sep. 10, 2018, 7 pages.

Iowa State University, "Iowa State University Doubled Haploid Facility" at http://www.plantbreeding.iastate.edu/DHF/DHF.htm, Feb. 25, 2010 to Jul. 7, 2018, Internet Archive, retrieved from <https://web.archive.org/web/*/http://www.plantbreeding.iastate.edu/DHF/DHF.htm> on Sep. 10, 2018, 4 pages.

Jones et al., 2012 Selection of haploid maize kernels from hybrid kernels for plant breeding using near-infrared spectroscopy and SIMCA analysis. Appl Spectrosc. 66(4):447-50. Retrieved from <https://lib.dr.iastate.edu/cgi/viewcontent.cgi?referer=&httpsredir=1&article=1156&context=ameslab_pubs> on Sep. 20, 2018.

Melchinger et al., 2014 In vivo haploid induction in maize: Identification of haploid seeds by their oil content. Crop Science 54(4):1497-1504. Retrieved from <https://www.researchgate.net/profile/Vilson_Mirdita/publication/263008760_In_Vivo_Haploid_Induction_in_Maize_Identification_of_Haploid_Seeds_by_Their_Oil_Content/links/02e7e53986f97d0bee000000/In-Vivo-Haploid-Induction-in-Maize-Identification-of-Haploid-Seeds-by-Their-Oil-Content.pdf> on Sep. 10, 2018.

Mevik, B.; Wehrens, R.; Liland, K. H. "pls: Partial least squares and principal component regression. R package version 2.3-0", http://CRAN.R-project.org/package=pls, 201, retrieved from GitHub at <https://github.com/cran/pls/commit/55479384c7d457a85e6ab7587fbb4bcb3371a4bb> on Sep. 7, 2018, 21 pages.

Venables, W. N. & Ripley, B. D., "Modern Applied Statistics with S. Fourth Edition", Mar. 15, 2002, 504 pages, Springer, New York, retrieved from <http://www.bagualu.net/wordpress/wp-content/uploads/2015/10/Modern_Applied_Statistics_With_S.pdf> on Sep. 10, 2018.

Bays, T. M., et al., "Development of a calibration to predict maize seed composition using single kernel near infrared spectroscopy", Journal of Cereal Chemistry, 2006, pp. 236-243, vol. 43, Elsevier Ltd.

Brenner, E. A., et al., "Genotypic and phenotypic characterization of isogenic doubled haploid exotic introgression lines in maize", Mol Breeding, Feb. 17, 2012, pp. 1001-1016, vol. 30, Springer.

Gustin, J. L., et al., "Analysis of Maize (*Zea mays*) Kernel Density and Volume Using Microcomputed Tomography and Single-Kernel Near-Infrared Spectroscopy", Journal of Agricultural and Food Chemistry, 2013, pp. 10872-10880, vol. 61, ACS Publications.

Hacisalihoglu, G., et al "Enhanced Single Seed Trait Predictions in Soybean (Glycine max) and Robust Calibration Model Transfer with Near-Infrared Reflectance Spectroscopy", Journal of Agricultural and Food Chemistry, 2016, pp. 1079-1086, vol. 64, ACS Publications.

Hacisalihoglu, G., et al., "Near-Infrared Reflectance Spectroscopy Predicts Protein, Starch, and Seed Weight in Intact Seeds of Common Bean (*Phaseolus vulgaris* L.)", Journal of Agricultural and Food Chemistry, Dec. 12, 2009, pp. 702-706, vol. 58, ACS Publications.

Melchinger, A. E., et al., "Controlling Misclassification Rates in Identification of Haploid Seeds from Induction Crosses in Maize with High-Oil Inducers", Crop Science, Mar. 27, 2015, pp. 1076-1086, vol. 55, issue 3, Alliance of Crop, Soil, and Environmental Science Societies.

Spielbauer, G., et al., "High-Throughput Near-Infrared Reflectance Spectroscopy for Predicting Quantitative and Qualitative Composition Phenotypes of Individual Maize Kernels", Cereal Chemistry, 2009, pp. 556-564, vol. 85, issue 5, AACC International, Inc.

* cited by examiner

HAPLOID SEED CLASSIFICATION USING SINGLE SEED NEAR-INFRARED SPECTROSCOPY

CROSS REFERENCE TO RELATED APPLICATIONS

This application is a National Stage Application, filed under 35 U.S.C. 371, of International Application No. PCT/US2017/022310, filed Mar. 14, 2017, which claims priority to U.S. Application No. 62/308,549, filed Mar. 15, 2018; the contents of both of which are hereby incorporated by reference in their entirety.

GOVERNMENT SUPPORT

This invention was made with government support under Grant No. 1444456 awarded by the National Science Foundation and under Grant No. 2011-67003-30215 awarded by the United States Department of Agriculture. The government has certain rights in the invention.

BACKGROUND

Related Field

Description of Related Art

Doubled haploids (DHs) are used extensively in maize breeding programs. Haploid seeds are generated using pollen from a genetic stock known to induce haploid embryo development. Haploid seedlings can then be treated with colchicine to induce genome doubling and a new inbred breeding stock. Steps involved in DH production can be inefficient. Sorting of haploid seeds is conventionally based on qualitative manual identification by R-nj color markers. For certain crosses possessing dominant repressors of the R-nj color marker, such as tropical landraces and sweet corn, difficulty in manual haploid sorting can greatly restrict DH breeding in these germplasm groups.

BRIEF SUMMARY

Embodiments of the subject invention provide methods for identifying haploid maize kernels in haploid induction crosses. A method of sorting haploid kernels can include capturing near-infrared (NIR) spectra and applying a general multivariate statistical model to the acquired NIR spectra to discriminate haploid kernels from diploid-hybrid kernels mixed therein. In an embodiment, NIR spectra can be collected on a single kernel using a high-throughput apparatus such that the amount of time required to analyze individual kernels is significantly reduced in comparison to existing NIR-based sorting technology and traditional manual sorting. In a preferred embodiment, a Linear Discriminant Analysis (LDA) can be applied to the acquired spectroscopic data to derive a model for reliable classification of haploid seeds from diverse germplasm sources scanned by the NIR spectrometer.

Advantageously, methods provided herein enable quantitative and accurate sorting of single-kernel haploid seeds that are traditionally identified qualitatively using R-nj color markers, thereby increasing the efficiency of the sorting process and allowing a broader set of germplasm sources to be available for DH production.

DETAILED DESCRIPTION OF VARIOUS EMBODIMENTS

Embodiments of the subject invention provide methods for identifying haploid maize kernels in haploid induction crosses. In some embodiments, methods provided herein can be used in assisting in the development of DH techniques in other cereal crops for which double haploids can be selected at the mature seed stage, with non-limiting examples including sorghum and millet. Advantageously, methods provided herein enable automated accurate sorting of haploid kernels that are traditionally identified qualitatively using R-nj color markers, thereby increasing the efficiency of the sorting process and allowing a broader set of germplasms to be identified for DH production.

In an embodiment, a method of sorting haploid kernels comprises determining kernel composition and quality values using a near-infrared (NIR) spectrometer and applying a general multivariate statistical model to the acquired NIR spectra to discriminate haploid kernels from diploid-hybrid kernels mixed therein. NIR spectra can be collected on a single kernel using a high-throughput apparatus such that the amount of time required to analyze individual kernels is significantly reduced in comparison to existing NIR-based sorting technology and in comparison to traditional manual sorting.

Figure 1:
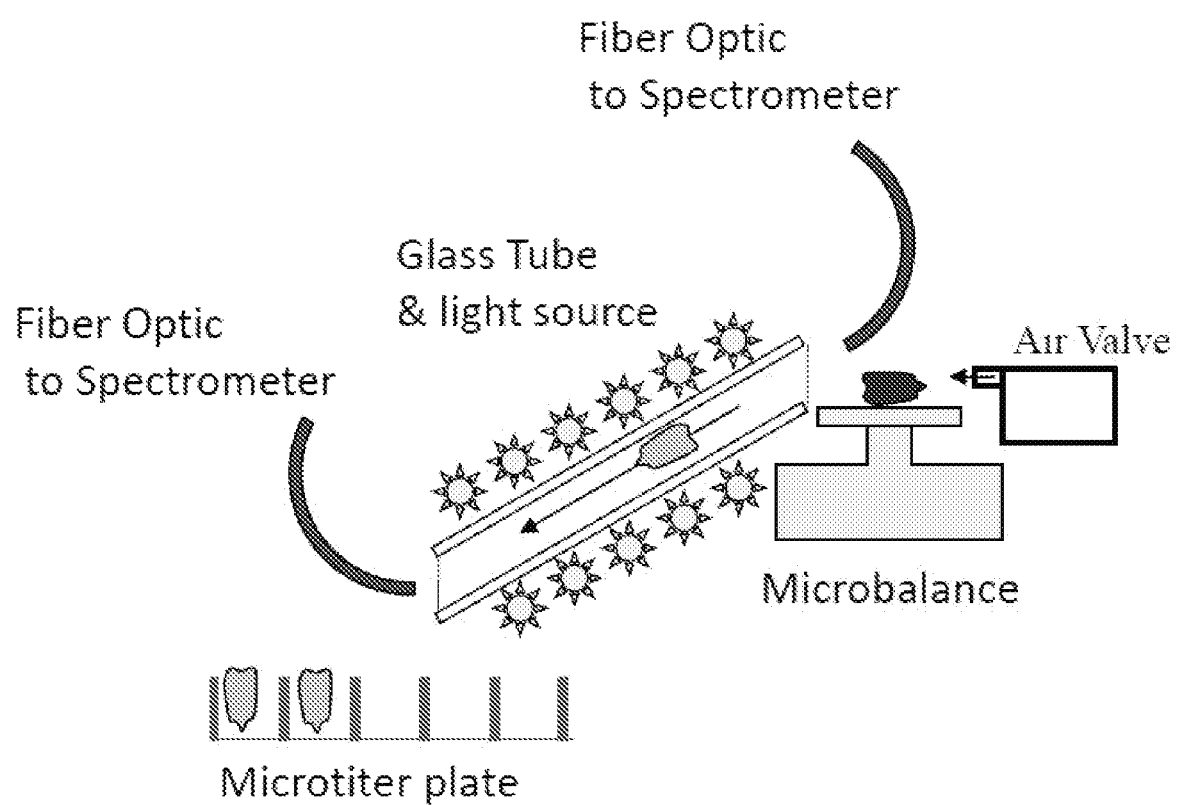
FIG. 1 shows a schematic illustration of a high-throughput single-kernel NIR analyzer according to an embodiment of the subject invention.
Figure 2:
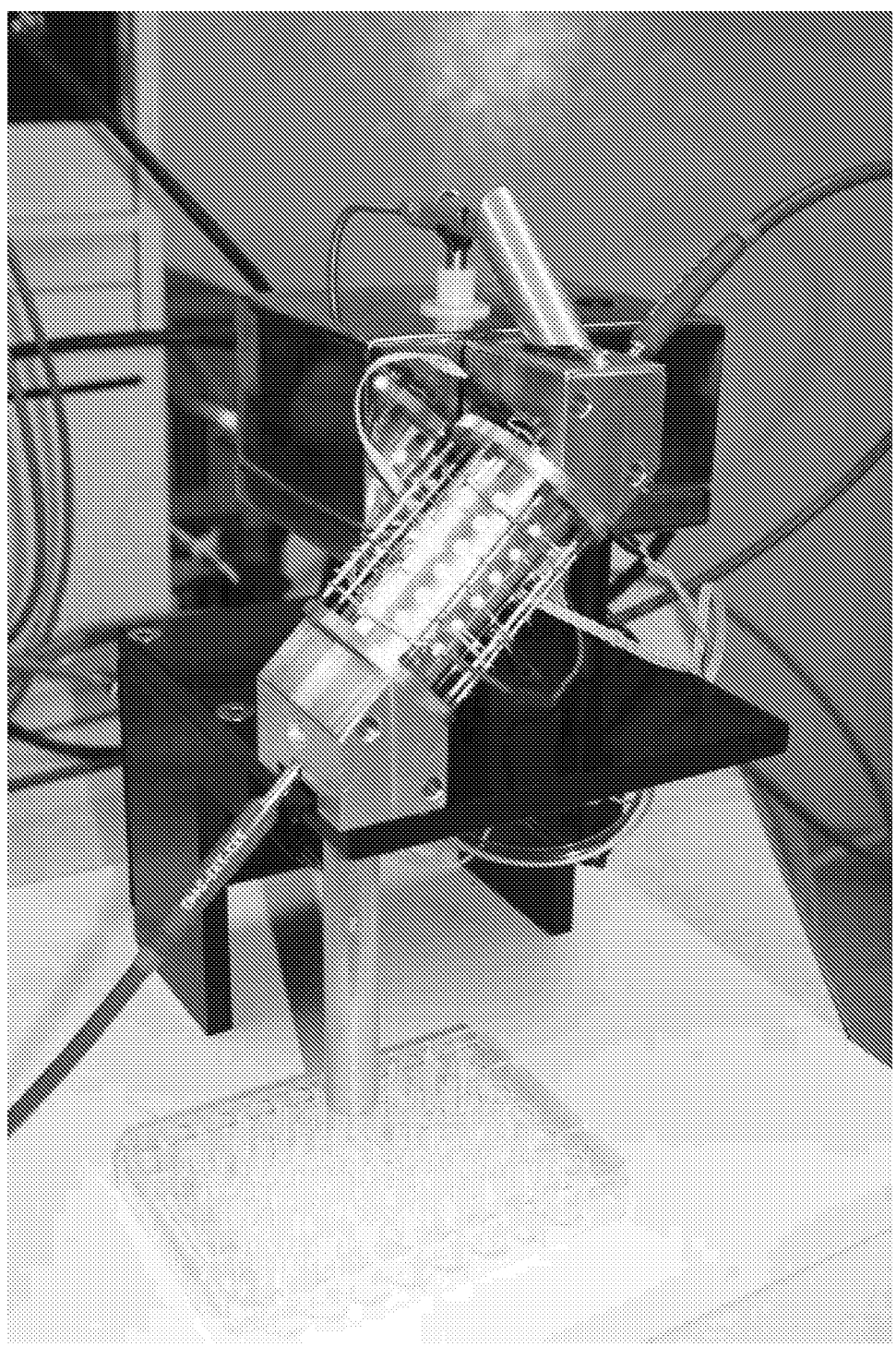
FIG. 2 shows an image of a high-throughput single-kernel NIR analyzer according to an embodiment of the subject invention.

In an exemplary embodiment, the NIR platform employs a conventional open-source design such as, for example, one obtained from the U.S. Department of Agriculture-Agriculture Research Service in Manhattan, Kans. As illustrated in FIG. 1, a single-kernel NIR (skNIR) device can include an air valve, two 400-micro fiber optics connecting the device to an InGaAs array-based spectrometer, a 12 mm×67 mm borosilicate glass tube, a light source, and a microtiter plate. Optionally, the NIR device can comprise a microbalance used to measure seed weight.

In certain embodiments, the method of acquiring NIR spectra of single kernels can include weighing each kernel on the microbalance, followed by blowing the kernel into the borosilicate glass tube (e.g., with an airstream provided by the air valve). The instrument can then collect an NIR spectral profile within a predetermined range of wavelengths as the kernel falls through the glass tube, which can be illuminated by a light source (e.g., a halogen light source). Light reflected by the kernel can subsequently be captured and relayed to a diode array-based spectrometer (e.g., by fiber optic cables located at the top and/or the bottom ends of the glass tube). The kernel can then be collected and indexed in the microtiter plate. In an embodiment, the NIR spectrum can be acquired for a range of wavelengths from about 907 nm to about 1689 nm (or any subrange located therewithin) in, for example, 1 nm intervals.

In one embodiment, a solenoid sorter can be attached to the NIR device to automate haploid seed selection. The data collection time for each single kernel can be on the order of seconds such as, for example, 1 second, 2 seconds, 3 seconds, 4 seconds, 5 seconds, or 6 seconds. Data collection time can also be less than 1 second when seed weight is not collected using the microbalance, and such collection time can be, for example, 0.3 second, 0.5 second, 0.6 second, or 0.8 second per kernel. When an exemplary automated embodiment of the skNIR device is employed, the spectra acquisition time can be as short as 0.25 second.

NIR spectra acquired using an apparatus discussed herein can reveal signals for major chemical components of the maize kernel such as, for example, protein, starch, and oil. In addition, kernel quality traits such as kernel volume, weight, density, and air space within the kernel can be estimated from the NIR spectra based on careful calibration results as previously reported (see, for example, Gustin et al., Journal of Agricultural and Food Chemistry 61, 10872-10880, 2013). Kernels comprising haploid embryos can display changes in kernel composition consistent with reduced embryo size, manifested as reduced kernel weight and/or relative oil content. Furthermore, minor, but statistically significant, changes in other kernel traits including protein and starch content can also be observed in haploid seeds. These compositional changes in haploid seeds provide a strong basis for discrimination using infrared light.

The use of skNIR for measuring the chemical composition of seeds has been previously reported (see, for example, Armstrong, P. R., 3 Applied Engineering in Agriculture 22: 767-772, 2006; Spielbauer, G., Armstrong, P. et al., Cereal Chemistry 86: 556-564, 2009); however, the spectral measurements were not used in combination with a multivariate statistical model to separate haploid seeds from their hybrid counterparts.

In some embodiments, the skNIR can distinguish haploid kernels from diploid kernels in haploid induction crosses using a general statistical regression model. In a preferred embodiment, a model created by Linear Discriminant Analysis (LDA) can be applied to the sorting process, resulting in reliable classification of haploid seeds from diverse germplasm sources scanned by the skNIR spectrometer.

LDA is a supervised classification method that, as opposed to an unsupervised method such as the principal component analysis (PCA), utilizes knowledge of haploid or diploid-hybrid class to calculate latent variables that emphasize spectral differences between species needing to be classified. In some embodiments, an LDA model requires a set of training spectra to which the haploid/diploid-hybrid class is known in order to build a calibration model that can then be used to predict the class of an unknown kernel based on its NIR spectra. In an embodiment, an LDA calibration model can be built using the spectral information from kernels of a randomly chosen portion of genotypes within a larger set of genotypes. Data of the remaining genotypes can be used to validate the calibration model.

In an embodiment of the subject invention, LDA can be a two-step process. First, partial least squares (PLS) regression models use the kernels' NIR spectra to generate kernel values for multiple traits. Table 1 shows exemplary ANOVA statistics for the effect of haploid status on each trait that can be derived from the NIR spectra. The traits impacted by haploid status are relative content of oil, starch, and protein; and density and volume. Second, these five kernel traits are then regressed on haploid/hybrid class structure using LDA implemented by the R statistical function 'lda' in package 'MASS' to identify the discriminant function that can best separate the classes.

TABLE 1

An exemplary two-way ANOVA statistics (Type I) modeling kernel traits with induction cross (cross) and kernel ploidy (ploidy) as the main effects. "Coef" denotes the β coefficient of the ploidy term and indicates the haploid effect on a given trait.

| Seed trait | Effect | df$^a$ | Coef | Std Error Coef | Mean Sq | F-stat | p value |
|---|---|---|---|---|---|---|---|
| Weight (mg) | cross | 14 | — | — | 45538 | 25.0 | <0.0001 |
|  | ploidy | 1 | −18.4 | 2.34 | 111633 | 61.2 | <0.0001 |
| Oil (%) | cross | 14 | — | — | 9.71 | 20.3 | <0.0001 |
|  | ploidy | 1 | −0.90 | 0.04 | 270 | 563 | <0.0001 |
| Protein (%) | cross | 14 | — | — | 149 | 81.7 | <0.0001 |
|  | ploidy | 1 | 0.19 | 0.07 | 12.2 | 6.65 | 0.01 |
| Starch (%) | cross | 14 | — | — | 1104 | 102 | <0.0001 |
|  | ploidy | 1 | 0.21 | 0.18 | 15.0 | 1.40 | 0.2 |
| Density (total) (g/cm$^3$) | cross | 14 | — | — | 0.10 | 22.5 | <0.0001 |
|  | ploidy | 1 | −0.015 | 0.003 | 0.07 | 17.0 | <0.0001 |
| Density (material) (g/cm$^3$) | cross | 14 | — | — | 0.05 | 47.4 | <0.0001 |
|  | ploidy | 1 | 0.002 | 0.002 | 0.002 | 1.6 | 0.2 |
| Volume (total) (g/cm$^3$) | cross | 14 | — | — | 21650 | 24.8 | <0.0001 |
|  | ploidy | 1 | −8.72 | 1.62 | 25212 | 28.9 | <0.0001 |
| Volume (material) (g/cm$^3$) | cross | 14 | — | — | 18545 | 26.7 | <0.0001 |
|  | ploidy | 1 | −9.60 | 1.45 | 30522 | 43.9 | <0.0001 |

The LDA model discussed herein uses composition and seed size traits to complete the sorting instead of using anthocyanin colors obtained from, for example, R-nj color markers. Prior works (see, for example, Jones, R. W., Reinot, T. et al., Applied Spectroscopy 66: 447-450, 2012; Melchinger, A. E., Winter, M. et al., Crop Science 55: 1076-1086, 2015; Melchinger, A. E., Schipprack, W. et al., Crop Science 54: 1497-1504, 2014) have demonstrated methods of haploid seed sorting based on the kernels' chemical composition using alternative devices including, for example, nuclear magnetic resonance (NMR) and near-infrared transmission (NIT) spectroscopy. The data collection time on a single kernel afforded by these devices varies from seconds to minutes, which can be orders of magnitude slower than the methods provided herein.

A major advantage of the skNIR sorting provided herein is the speed at which the seeds can be sorted. Efficient sorting is integral to the DH breeding process. Induction crosses need to be rapidly sorted soon after harvest before being planted in the next available nursery. The population size of haploid induction crosses is typically 15,000 to 30,000 kernels, and a small proportion thereof, typically 1-10%, will have haploid embryos. When a color marker such as the R-nj marker is used, the haploid seeds are selected visually with manual labor. Experienced personnel manually sorting haploids can process approximately 1000 seeds per hour, provided that the color markers are clearly expressed in the kernels, requiring approximately 15 to 30 man-hours to process a single haploid induction population in related art methods.

Advantageously, spectra acquired using the skNIR device provided herein can be integrated over 20 milliseconds, and sorting individual kernels can take less than one second. The theoretical throughput of an automated embodiment of the skNIR device can be nearly 10-fold higher than the speed of manual sorting. In the design of the skNIR device discussed herein, the rate-limiting step for spectral acquisition of a single seed is the time needed for the seed to pass through the light tube, which is approximately 0.25 second. At this rate, the skNIR device could conservatively process 10,000 seeds per hour, and several haploid induction populations could be sorted in a single day. Advantageously, faster sample processing time can reduce labor costs and minimize the time required for DH production pipeline.

The skNIR platform and the general LDA model discussed herein, being built upon diverse genetic materials, can identify an optimal LDA vector to distinguish haploid from diploid kernels in any cross without prior knowledge of the genotypic class structure thereof. Advantageously, the LDA model can be optimized to conduct efficient haploid selection and to allow a broader set of germplasms to be included in doubled haploid (DH) production, potentially including sweet corn and tropical germplasm sources that currently cannot be bred efficiently with DH technology.

Furthermore, the accuracy of haploid selection based on chemical composition of the kernels may be more stable across a wide diversity of germplasm than visual sorting based on a color marker. Manual sorting based on visual kernel markers is not perfectly accurate as the accuracy depends largely upon expression of the color markers in the kernel. Previous reporting has shown wide variations in visual sorting accuracy in induction crosses using diverse female donors (see Melchinger, A. E., Schipprack, W. et al., Crop Science 54: 1497-1504, 2014). Improving haploid sorting accuracy would add efficiency to DH production process by allowing a "fine tuning" of the resources used to generate DH inbred lines.

Another advantage of the sorting method based on spectra (e.g., skNIR spectra) is the reduced or removed requirement of visible color markers for haploid sorting. Typically, breeding efforts to improve inducer line performance is hindered by requiring the inducer lines to carry either dominant color markers. Single-kernel NIR sorting, however, is based on the kernel composition changes resulting from haploid embryo development and will thus allow sorting in genetic backgrounds that suppress color markers. Dominant color markers depend upon multiple, unlinked loci, creating excessive linkage drag when attempting to improve the agronomic and induction performance by traditional plant breeding. Advantageously, embodiments of the subject invention can lead to development and testing of new inducer lines with greater and more consistent haploid induction rate, and ultimately enable DH maize breeding for a broader international market by allowing development of inducer lines that are adapted to a wider range of agricultural environments.

Additionally, embodiments provided herein can enable the potential development of a standalone skNIR device equipped with a novel mathematical model for augmenting or replacing manual screening services and providing a less expensive alternative to NMR kernel sorters.

The terms "seeds" and "kernels" are used interchangeably herein in the context of maize species. The terms "diploid-hybrid", "diploid", and "hybrid" are used interchangeably herein.

The methods and processes described herein (e.g., mathematical models such as LDA models) can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Machine-readable media (e.g., computer-readable media) should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of sorting haploid seeds, the method comprising:

providing a population of seeds to be sorted, each seed being either a haploid seed or a diploid-hybrid seed;

providing an apparatus comprising a light source and a spectrometer capable of examining each seed individually;

illuminating each seed with light generated by the light source;

acquiring at least one spectrum for each seed;

processing the at least one spectrum of each seed using computer software with user-determined parameters and storing the data in a data matrix;

calibrating a regression model based on a portion of the data matrix that excludes a selected genotype of seeds, the genotype being considered a held-out genotype;

cross-validating the regression model by holding out each genotype present in the population of seeds and repeating the classification step; and classifying a randomly sampled seed using the validated model.

Embodiment 2

The method according to embodiment 1, wherein the haploid seeds are maize kernels.

Embodiment 3

The method according to any of embodiments 1-2, wherein the regression model employs a linear discriminate analysis (LDA).

Embodiment 4

The method according to any of embodiments 1-3, wherein the seeds to be sorted are of at least one induction cross.

Embodiment 5

The method according to any of embodiments 1-4, wherein the seeds to be sorted are of the same genotypic background.

Embodiment 6

The method according to any of embodiments 1-4, wherein the seeds to be sorted are of different genotypic backgrounds.

Embodiment 7

The method according to any of embodiments 3-6, wherein the accuracy of the classification step is improved by assigning a score to each seed following the LDA analysis, and setting a fraction threshold for the population of seeds based on their scores and the predicted induction frequency and/or the size of the induction population, Embodiment 8

The method according to any of embodiments 1-7, wherein the apparatus further comprises an air valve, a transparent seed passage tube, a balance capable of measuring the weight of each seed, and fiber optics accompanying the spectrometer.

Embodiment 9

The method according to embodiment 8, wherein the apparatus further comprises an automated seed sorter.

Embodiment 10

The method according to embodiment 9, wherein the automated seed sorter is a solenoid sorter.

Embodiment 11

The method according to any of embodiments 1-10, wherein the light source emits near-infrared (NIR) light.

Embodiment 12

The method according to embodiment 11, wherein the light source emits light in a wavelength range of between 907 nm and 1689 nm (or any subrange therewithin).

Embodiment 13

The method according to any of embodiments 1-12, capable of differentiating at least one of the following traits of the population of seeds being sorted: relative oil content, relative protein content, relative starch content, seed density, and seed volume.

Embodiment 14

The method according to any of embodiments 1-13, wherein the time required for sorting each seed in the population is less than 1 second.

Embodiment 15

The method according to any of embodiments 1-13, wherein the time is required for sorting each seed is less than 0.25 second.

Embodiment 16

The method according to any of embodiments 1-13, wherein the time is required for sorting each seed is 0.25 second.

Embodiment 17

The method according to any of embodiments 3-16, wherein the LDA is implemented by an R-based statistical function capable of discriminating the haploid seeds from the diploid hybrid seeds.

Embodiment 18

An apparatus for sorting haploid seeds, the apparatus comprising:
a light source;
a spectrometer capable of examining single seeds individually;
an air valve;
a seed passage tube;
fiber optics accompanying the spectrometer; and
a (non-transitory) machine-readable medium (e.g., (non-transitory) computer-readable medium) in operable communication with the spectrometer, the machine-readable having machine-executable instructions (e.g., computer-executable instructions) stored thereon for performing a method (e.g., when executed by a processor, the instructions perform the method) comprising the following steps:
processing at least one spectrum of each seed, obtained from the spectrometer, with user-determined parameters;
storing the data of the at least one spectrum of each seed in a data matrix; and calibrating a regression model based on a portion of the data matrix that excludes a selected genotype of seeds, the genotype being considered a held-out genotype.

Embodiment 19

The apparatus according to embodiment 18, wherein the method performed by the machine-executable instructions further comprises:
cross-validating the regression model by holding out each genotype present in the population of seeds and repeating the classification step; and
classifying a randomly sampled seed using the validated model.

Embodiment 20

The apparatus according to any of embodiments 18-19, wherein the seed passage tube is a transparent seed passage tube.

Embodiment 21

The apparatus according to any of embodiments 18-20, further comprising a balance capable of measuring the weight of single seeds individually.

Embodiment 22

The apparatus according to any of embodiments 18-21, further comprising an automated seed sorter.

Embodiment 23

The apparatus according to embodiment 22, wherein the automated seed sorter is a solenoid sorter.

Embodiment 24

The apparatus according to any of embodiments 18-23, wherein the light source is a near-infrared (NIR) light source that emits NIR light.

Embodiment 25

The method according to embodiment 24, wherein the light source emits light in a wavelength range of between 907 nm and 1689 nm (or any subrange therewithin).

Embodiment 26

The apparatus according to any of embodiments 18-25, wherein the regression model employs a linear discriminate analysis (LDA).

Embodiment 27

The method according to embodiment 26, wherein the accuracy of the classification step is improved by assigning a score to each seed following the LDA analysis, and setting a fraction threshold for the population of seeds based on their scores and the predicted induction frequency and/or the size of the induction population.

Embodiment 28

The apparatus according to any of embodiments 26-27, wherein the LDA is implemented by an R-based statistical function capable of discriminating the haploid seeds from the diploid hybrid seeds.

Embodiment 29

The apparatus according to any of embodiments 18-28, further comprising a processor in operable communication with the (non-transitory) machine-readable medium (e.g., (non-transitory) computer-readable medium), the processor being capable of causing the machine-executable instructions (e.g., computer-executable instructions) stored on the medium to perform the method.

A greater understanding of the present invention and of its many advantages may be had from the following example, given by way of illustration. The following example is illustrative of some of the methods, applications, embodiments and variants of the present invention. It is, of course, not to be considered as limiting the invention. Numerous changes and modifications can be made with respect to the invention.

Example 1

Figure 3:
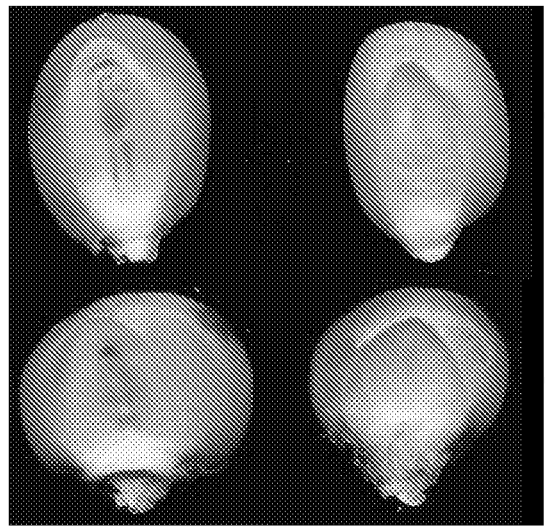
FIG. 3 shows images of hybrid and haploid seeds from different pedigrees

To develop a classification algorithm, a set of 1354 kernels obtained from the Iowa State University (ISU) Doubled Haploid Facility were scanned with a skNIR spectrometer. A total of 14 induction crosses were sampled. The female donor for the induction cross originated from the Germplasm Enhancement of Maize (GEM) project (see, for example, Brenner et al., 2012 Mol Breeding 30: 1001). For each cross, 48 haploids and 48 diploid-hybrids were visually identified by the ISU staff using traditional R-nj color markers. Hybrids have anthocyanin accumulation in the embryo, while haploids lack anthocyanins in the embryo (FIG. 3). The ploidy of the kernels was subsequently confirmed by genotyping seedling tissue after the kernels had been analyzed by the skNIR.

Two NIR spectra were collected from each kernel. Each spectrum was mean-centered, and the average profile was used for modeling. Seed trait predictions showed that haploid seeds have statistically significant differences in kernel weight, density, and volume, as well as oil and protein content based on ANOVA (see Table 1). These data show that haploid embryos impact multiple kernel traits simultaneously.

Prior to model selection, the ratio of haploid kernels to hybrid kernels was adjusted to reflect a typical induction-cross haploid frequency of 12% haploids and 88% hybrids. Six haploid kernels were randomly sampled from the starting pool of 48 from each induction cross. The kernels were split into calibration and external validation datasets with the kernels from all but one genotype used to calibrate the model. The calibration model was used to classify the kernels of the held-out genotype as haploid or diploid. Leave-one-out (LOO) cross-validations were run 14 times with each genotype being held out for external validation in turn. This process was repeated 100 times with random sampling of the haploid kernels at each iteration. This method produced approximately 75,000 independent classifications.

Sorting accuracy is defined in terms of a false negative rate (FNR), which is the percentage of haploids that were classified as hybrids and a false discovery rate (FDR), which is the percentage of classified haploids that are actually hybrid. The composite error rate (CER) is the sum of FDR and FNR and is a useful metric for comparing accuracy between models and induction populations. The general LDA model's FDR and FNR was 0.40 and 0.78, respectively, with a CER of 1.18.

Figure 4:
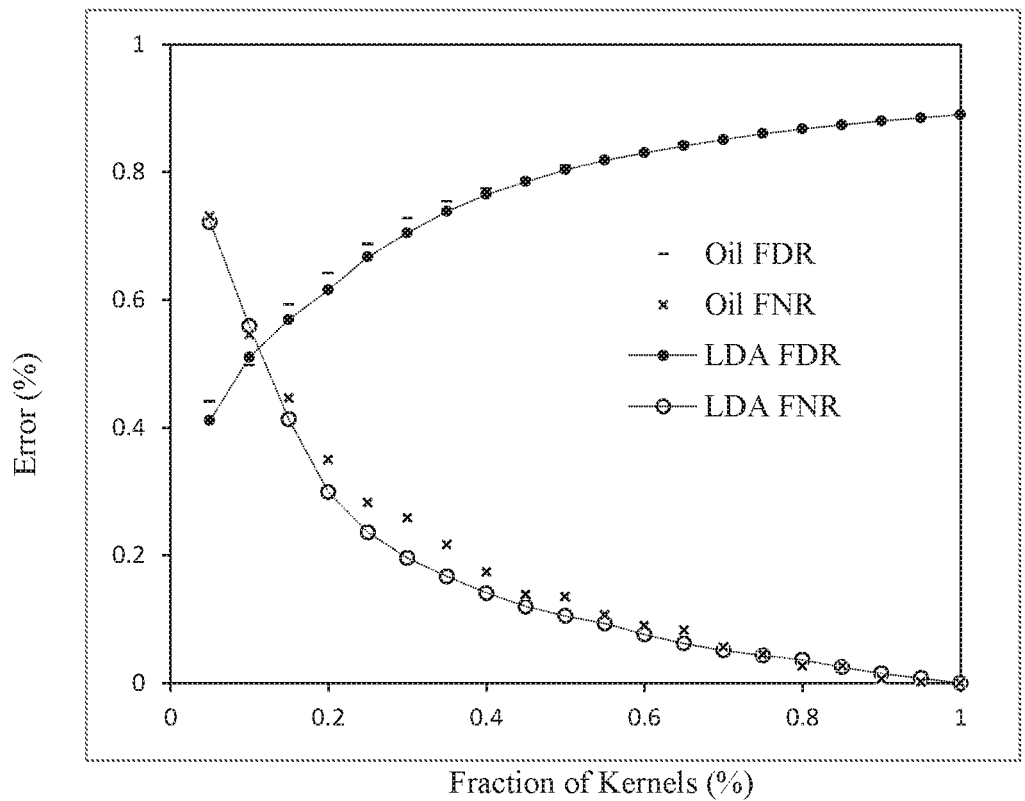
FIG. 4 shows a graph of the false discovery rate and false negative rate of sorting accuracy of kernel oil content alone (i.e., "Oil FDR" and "Oil FNR") and the linear discriminate model (i.e., "LDA FDR" and "LDA FNR") according to an embodiment of the subject invention.

Further improvements were made in classification accuracy by applying a thresholding method based on the LDA scores derived from the LDA model. For this method, the kernels with the lowest LDA score in each induction cross were classified as haploid. FIG. 4 shows how the FDR and FNR change as an increasing number of low LDA score kernels are included into the fraction. As expected, increasing the fraction of lowest LDA score kernels reduces FNR as more haploids are included and increases FDR due to greater inclusion of hybrid kernels. Setting a fraction threshold based on induction frequency and the size of the induction population would be a tradeoff between the FDR and FNR. For example, in the induction cross populations experimented herein, selecting 15% of kernels with the lowest LDA score would yield a pool of kernels that contained 43% haploids (FDR=0.57) and recover 59% of all the haploids (FNR=0.41) on average.

Haploid discrimination approaches that use NMR rely only on oil content to classify haploids; however, it has been found that other kernel characteristics can also contribute to haploid discrimination. To test whether oil content alone could classify haploid and hybrid kernels as well as the LDA scores, the same threshold approach was taken except that kernels with the lowest oil content were binned into the predicted haploid group rather than kernels with the lowest LDA scores. FIG. 4 shows that the FDR and FNR curves for oil alone are very similar to the FNR and FDR curves based on LDA scores. However, the LDA score method generates a modestly higher accuracy of between the 5% and 35% fractions. This is consistent with previous data showing that oil is the main discriminating variable. However, adding the additional skNIR-based traits improved discrimination.

The thresholding strategy using LDA scores enriched haploids in all induction crosses examined. At a threshold of 20%, CER among the induction crosses ranged from 0.58 to 1.43 (Table 2). All but one of the induction crosses had an FNR of less than 0.5, which means that over 50% of the haploids in the population were correctly identified. Binning 20% of the lowest LDA score kernels also enriched all induction crosses to at least twice the induction rate of the original population (12%) and in 6 induction crosses, the 20% bin would contain over 40% haploids. These data demonstrate the utility of the skNIR method in enriching an induction crosses for haploid kernels.

TABLE 2

Accuracy of classification of each induction cross when classifying kernels with the bottom 20% of LDA scores as haploid.

| Induction cross | FDR | FNR | CER |
|---|---|---|---|
| (GEM1161 × PHZ51) × inducer | 0.61 | 0.29 | 0.90 |
| (GEM1171 × PHZ51) × inducer | 0.55 | 0.25 | 0.79 |
| (GEM1183 × PHZ51) × inducer | 0.63 | 0.32 | 0.95 |
| (GEM1206 × PHZ51) × inducer | 0.69 | 0.39 | 1.08 |
| (GEM1230 × PHZ51) × inducer | 0.68 | 0.42 | 1.11 |
| (GEM1239 × PHB47) × inducer | 0.55 | 0.17 | 0.72 |
| (GEM1244 × PHB47) × inducer | 0.80 | 0.63 | 1.43 |

TABLE 2-continued

Accuracy of classification of each induction cross when classifying kernels with the bottom 20% of LDA scores as haploid.

| Induction cross | FDR | FNR | CER |
|---|---|---|---|
| (GEM1253 × PHB47) × inducer | 0.53 | 0.05 | 0.58 |
| (GEM1262 × PHB47) × inducer | 0.52 | 0.20 | 0.71 |
| (GEM1271 × PHB47) × inducer | 0.55 | 0.18 | 0.73 |
| (GEM1276 × PHB47) × inducer | 0.56 | 0.20 | 0.76 |
| (GEM1284 × PHB47) × inducer | 0.65 | 0.34 | 0.99 |
| (GEM1300 × PHB47) × inducer | 0.62 | 0.30 | 0.91 |
| (GEM1302 × PHB47) × inducer | 0.51 | 0.16 | 0.67 |
| (GEM1320 × PHB47) × inducer | 0.70 | 0.46 | 1.16 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

1. Armstrong, P. R. 2006. Rapid single-kernel NIR measurement of grain and oil-seed attributes. 3 Appl. Eng. Agric. 22:767-772.
2. Jones et al., 2012 Selection of haploid maize kernels from hybrid kernels for plant breeding using near-infrared spectroscopy and SIMCA analysis. Appl Spectrosc. 66(4): 447-50.
3. Brenner et al., 2011 Genotypic and phenotypic characterization of isogenic doubled haploid exotic introgression lines in maize. Mol Breeding (2012) 30: 1001.
4. BoMill (http://www.bomill.com/) has a patented single seed sorter which uses Near-infrared transmission (NIT) spectrocospy to sort wheat and barley seed at a rapid rate. European Patent, EC B07C5/34; G01N2/35G.
5. Brimrose COA has a single seed NIR sorter product called Luminar 3076 that uses Acousto Optic Tunable Filter Near-Infrared (AOTF-NIR). http://www.brimrose.com/products/nir_mir_spectrometers/sort_by_spectrometers/3076.html.
6. Melchinger et al., 2014 In vivo haploid induction in maize: Identification of haploid seeds by their oil content. Crop Science 54(4):1497-1504.
7. Melchinger et al., 2015 Controlling misclassification rates in identification of haploid seeds from induction crosses in maize with high-oil inducers. Crop Science 55(3): 1076-1086.
8. Hacisalihoglu G., Gustin J. L., Louisma J., Armstrong P., Peter G. F., Walker A. R., Settles A. M. (2016) Enhanced Single Seed Trait Predictions in Soybean (*Glycine max*) and Robust Calibration Model Transfer with Near-Infrared Reflectance Spectroscopy. *J. Agric. Food Chem.* 64:1079-1086.
9. Gustin et al., Journal of Agricultural and Food Chemistry 61, 10872-10880, 2013.
10. Hacisalihoglu et al., Journal of Agricultural and Food Chemistry 2010—Common Bean
11. Spielbauer et al., Journal of Cereal Chemistry 2006—Maize 12. Iowa State University Doubled Haploid Facility: http://www.plantbreeding.iastate.edu/DHF/DHFhtm.
13. Germplasm Enhancement of Maize (GEM) Project: http://www.public.iastate.edu/~usda-gem/GEM_Project/GEM_Project.htm.
14. Spielbauer, G., Armstrong, P. et al., Cereal Chemistry 86: 556-564, 2009.
15. Mevik, B.; Wehrens, R.; Liland, K. H. pls: Partial least squares and principal component regression. R package version 2.3-0. http://CRAN.R-project.org/package=pls, 2011.
16. Venables, W. N. & Ripley, B. D. (2002) Modern Applied Statistics with S. Fourth Edition. Springer, New York. ISBN 0-387-95457-0.

What is claimed is:

1. A method of sorting haploid seeds, comprising:
providing a population of seeds to be sorted, each seed being either a haploid seed or a diploid-hybrid seed;
providing an apparatus comprising a light source and a spectrometer capable of examining each seed individually;
illuminating each seed with light generated by the light source;
acquiring at least one spectrum of each seed;
processing the at least one spectrum of each seed using computer software with user-determined parameters and storing the data in a data matrix;
calibrating a regression model based on a portion of the data matrix that excludes a selected genotype of seeds, the genotype being considered a held-out genotype;
cross-validating the regression model by holding out each genotype present in the population of seeds and repeating the classification step; and
classifying a randomly sampled seed using the validated model.

2. The method according to claim 1, wherein the haploid seeds are maize kernels.

3. The method according to claim 1, wherein the regression model employs a linear discriminate analysis (LDA).

4. The method according to claim 3, wherein the accuracy of the classification step is improved by assigning a score to each seed following the LDA analysis, and setting a fraction threshold for the population of seeds based on: their scores and the predicted induction frequency; the size of the induction population; or both.

5. The method according to claim 3, wherein the LDA is implemented by an R-based statistical function capable of discriminating the haploid seeds from the diploid hybrid seeds.

6. The method according to claim 1, wherein the seeds to be sorted are of at least one induction cross.

7. The method according to claim 1, wherein the seeds to be sorted are of the same genotypic background.

8. The method according to claim 1, wherein the seeds to be sorted are of different genotypic backgrounds.

9. The method according to claim 1, wherein the apparatus further comprises an air valve, a transparent seed passage tube, a balance capable of measuring the weight of each seed, and fiber optics accompanying the spectrometer.

10. The method according to claim 9, wherein the time required for sorting each seed is the time it takes for the seed to pass through the transparent seed passage tube.

11. The method according to claim 1, capable of differentiating at least one of the following traits of the population of seeds being sorted: relative oil content, relative protein content, relative starch content, seed density, and seed volume.

12. The method according to claim 1, wherein the time required for sorting each seed in the population is less than 1 second.

13. The method according to claim 1, wherein the time is required for sorting each seed is 0.25 second.

14. An apparatus for sorting haploid seeds, the apparatus comprising:
a light source;
a spectrometer capable of examining single seeds individually;
an air valve;
a seed passage tube;
fiber optics accompanying the spectrometer; and
a machine-readable medium in operable communication with the spectrometer, the machine readable having machine-executable instructions stored thereon for performing a method comprising the following steps:
processing at least one spectrum of each seed, obtained from the spectrometer, with user-determined parameters;
storing the data of the at least one spectrum of each seed in a data matrix; and
calibrating a regression model based on a portion of the data matrix that excludes a selected genotype of seeds, the genotype being considered a held-out genotype.

15. The apparatus according to claim 14, wherein the seed passage tube is a transparent seed passage tube.

16. The apparatus according to claim 14, further comprising a balance capable of measuring the weight of single seeds individually.

17. The apparatus according to claim 14, further comprising an automated seed sorter.

18. The apparatus according to claim 17, wherein the automated seed sorter is a solenoid sorter.

19. The apparatus according to claim 14, wherein the light source is a near-infrared (NIR) light source that emits NIR light.

20. The method according to claim 19, wherein the light source emits light in a wavelength range of between 907 nm and 1689 nm.

* * * * *